Oct. 27, 1942.　　　F. W. SAMPSON　　　2,300,013
TORSION JOINT
Filed Jan. 16, 1942

INVENTOR
Frederick W. Sampson
BY
Spencer Hardman & Faber
his ATTORNEYS

Patented Oct. 27, 1942

2,300,013

UNITED STATES PATENT OFFICE 2,300,013

TORSION JOINT

Frederick W. Sampson, Dayton, Ohio, assignor to General Motors Corporation, Detroit, Mich., a corporation of Delaware Application January 16, 1942, Serial No. 427,022

6 Claims. (Cl. 287—85)

This invention relates to yielding torsion joints which are adapted to be used to connect two members and yieldingly permit a relative rotary movement between the connected members. The torsion joint of this invention is particularly suitable for use as the rotary oscillating joints in automobile spring shackles and the like, or in any mechanical arrangement where a yielding torsion joint is desired which will permit a relative rotary movement thru a small angle between the two connected members. Yielding torsion joints of many designs are now well known.

An object of this invention is to provide an improved form of yielding torsion joint which is economical to manufacture and very simple in structure and yet is highly efficient in use and possesses long life.

A more specific object is to provide such a torsion joint which will be slightly flexible in all directions but will limit relative axial or endwise movement between the connected members to a small degree and with a relative high force and yet permit a relatively easy oscillatory rotary movement between the connected members.

Another specific object is to provide a torsion joint wherein flexible non-metallic material, such as rubber, is compressed in an axial or endwise direction between alternate ridges or baffles on the inner and outer members of the joint.

Another object is to provide such a joint wherein the baffles on the outer member or sleeve are made by radially inwardly collapsing spaced portions of said sleeve upon the confined non-metallic material and thus highly compress same for the final assembly of these parts.

Further objects and advantages of the present invention will be apparent from the following description, reference being had to the accompanying drawing wherein a preferred embodiment of the present invention is clearly shown.

In the drawing.

Similar reference characters refer to similar parts throughout the several views.

Figure 1:
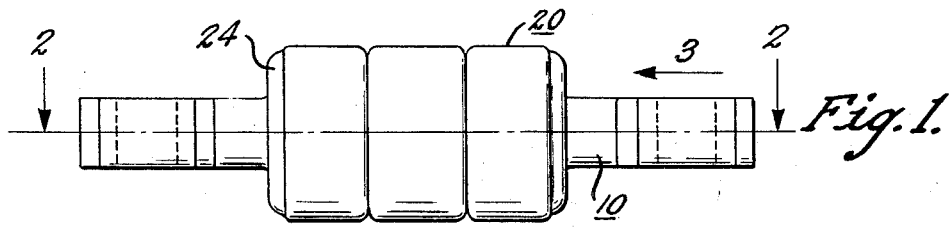
Fig. 1 is a side elevation of one form of a torsion joint made according to this invention.

In the form of the invention illustrated, the inner member 10 is a solid metal pin which has integrally formed therewith three longitudinally spaced exterior peripheral ridges or collars 11, preferably annular in shape, which thus provide two annular grooves 12 on said inner member. The two end portions 13 of inner member 10 have holes 14 therein, and are suitably shaped to be rigidly fastened to one of the members (not shown) to be connected together by the torsion joint. Such rigid fastening may be done by any other suitable and well known means which may be found convenient.

Figure 5:
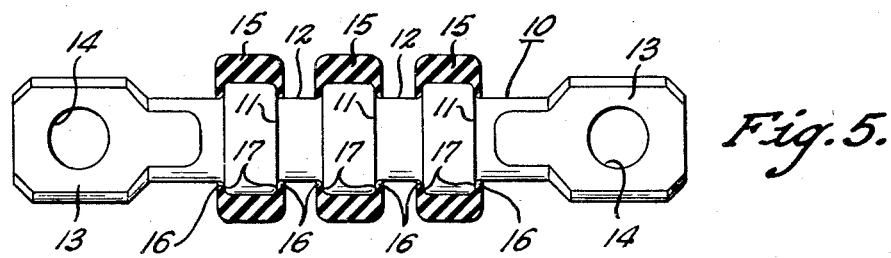
Fig. 5 shows the inner member of the joint after the three flexible rubber bushings have been bonded by vulcanization thereto, and prior to having the outer metal sleeve assembled thereupon.

Inner member 10 next has the three flexible rubber bushings 15 vulcanized and bonded thereto, preferably all at the same time by using member 10 as an insert in the rubber mold cavity, thus providing simplicity and economy of manufacture. As shown in Fig. 5, these rubber bushings 15 preferably are somewhat wider than the enclosed collars 11, thus providing rubber portions 16 which are securely bonded to the end surfaces 17 of the metal collars 11.

Figure 2:
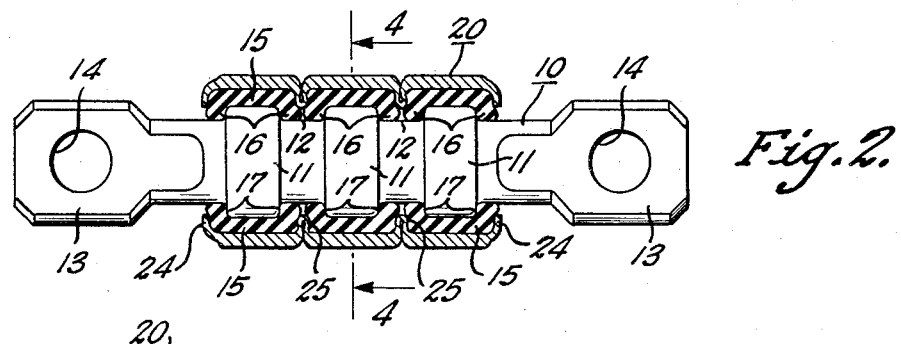
Fig. 2 is a section taken on line 2—2 of Fig. 1.
Figure 3:
Fig. 3 is an end view of Fig. 1.
Figure 4:
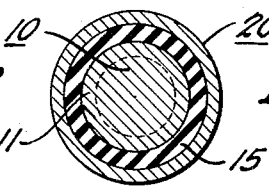
Fig. 4 is a section taken on line 4—4 of Fig. 2.
Figure 6:
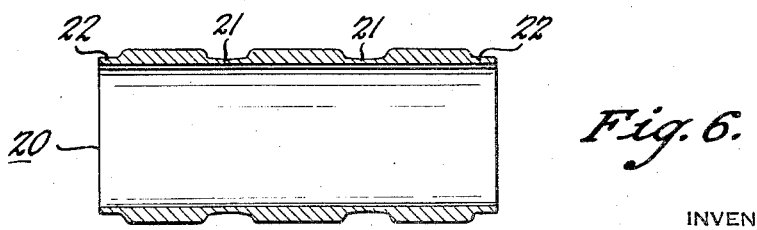
Fig. 6 shows the outer metal sleeve as originally formed, and just prior to having the unit shown in Fig. 5 inserted therein by radially compressing the three rubber bushings to its internal diameter.

The outer metal sleeve 20 is first formed, as shown in Fig. 6, with two thin wall portions 21 of suitable width formed therein for a purpose described below. The thin wall end portions 22 on sleeve 20 may also be provided, if desired, in order to facilitate the inward flanging over of these end portions as shown in Fig. 2.

To assemble these parts, the unit shown in Fig. 5 is inserted thru the metal sleeve 20 so that these parts are accurately centered lengthwise. To make this insertion the rubber bushings 15 must be materially radially compressed since the inner diameter of sleeve 20 is made considerably less than the outer diameter of bushings 15 as originally molded. This can be seen from comparing Fig. 5 with Fig. 2. The next operation is to roll the thin portions 21 of sleeve 20 circumferentially and radially inwardly to start the inward collapsing of these two thin portions 21. This inward collapsing of thin portions 21 is preferably completed by applying endwise compression on the sleeve 20, which will cause the thin portions 21 to fold up and form the internal radial baffles 25, as illustrated in Fig. 2. These internal baffles 25 will further highly compress the rubber bushings 15 and are so dimensioned as to substantially directly compress the edge portions 16 of bushings 15 endwise against the end surfaces 17 of collars 11. By this means any relative endwise movement in either direction between inner member 10 and outer sleeve 20 will be highly resisted by a direct compression on a plurality of the annular rubber portions 16. In order to increase this effect preferably the end portions 22 of sleeve 20 are also flanged inwardly, as shown at 24 in Fig. 2, so that the endmost rubber portions 16 are also axially compressed against the next adjacent end surface 17 of collars 11.

It is of course to be understood that the degree of compression upon rubber bushings 15 will be sufficient to prevent any rotary slipping of outer sleeve 20 upon the rubber when sleeve 20 is given its normal rotary oscillations relative to inner member 10. It should be noted that such relative rotary movement between parts 10 and 20 is not materially affected by the above-described endwise compression of the annular rubber portions 16 and hence this torsion joint provides relative easy rotary oscillations while at the same time highly resists relative endwise movement between the connected members. The second connected member (not shown) may be a spring eye, or any other clamp member, which is fixedly clamped around the outside of sleeve 20.

Of course if desired the inner member 10 may be a hollow metal sleeve instead of a solid pin as shown, in which case it could be readily rigidly fastened to its connected member by a through bolt in any well known manner, and the operation thereof would remain as described above.

A possible optional method of making the torsion joint shown in Fig. 2 is to partially or completely form the inward radial flanges or baffles 25 on the outer sleeve 20 before inserting the unit shown in Fig. 5 therein. In this case the bushings 15 must be radially compressed during insertion to a sufficient extent to permit their slipping past such previously formed baffles 25. After such assembling of these parts together, the compression on the rubber may be increased if so desired by swaging the entire outer diameter of sleeve 20 to a smaller diameter as required.

While the embodiment of the present invention as herein disclosed, constitutes a preferred form, it is to be understood that other forms might be adopted, all coming within the scope of the claims which follow.

What is claimed is as follows:

1. A yielding torsion joint comprising: an inner member having a plurality of exterior ridges thereon, an individual flexible rubber bushing surrounding each of said ridges, an outer metal sleeve surrounding said inner member and said rubber bushings and collapsed endwise thereupon in such manner as to form inwardly extending baffles from the metal of said sleeve, said baffles being located on opposite sides of said exterior ridges of said inner member and serving to compress said rubber bushings endwise against said ridges.

2. A yielding torsion joint comprising: an inner member having a plurality of exterior ridges thereon, an individual flexible rubber bushing surrounding each of said ridges, and bonded thereto by vulcanization, an outer metal sleeve surrounding said rubber bushings and collapsed thereupon in such manner as to form peripheral inwardly extending baffles from the metal of said sleeve, said baffles being located alternately with said ridges along the length of said joint.

3. A yielding torsion joint comprising: an inner member having a plurality of exterior ridges thereon, flexible non-metallic material surrounding each of said ridges, and an outer metal sleeve surrounding and highly compressing said non-metallic material upon said inner member, said sleeve having inwardly extending baffles located alternately with said ridges along the length of said joint.

4. A yielding torsion joint comprising: an inner member having a plurality of exterior ridges therein, flexible non-metallic material surrounding each of said ridges, and an outer metal sleeve surrounding and highly compressing said non-metallic material upon said inner member, said sleeve having inwardly extending baffles located alternately with said ridges along the length of said joint, said baffles being formed integrally from the metal of said outer sleeve by an inward radial collapsing of portions of said sleeve.

5. A flexible torsion joint comprising: an inner member having a plurality of exterior collars rigid therewith, flexible non-metallic material surrounding said collars, and an outer metal sleeve surrounding and highly compressing said non-metallic material radially upon said inner member and axially against the end surfaces of said collars, said sleeve having inwardly extending baffles located on opposite sides of said collars of said inner member.

6. A flexible torsion joint comprising: an inner member having a plurality of exterior collars rigid therewith, flexible non-metallic material surrounding said collars, and an outer metal sleeve surrounding and highly compressing said non-metallic material radially upon said inner member and axially against the end surfaces of said collars, said sleeve having inwardly extending baffles located on opposite sides of said collars of said inner member, said baffles being formed integrally from the metal of said outer sleeve by an inward radial collapsing of portions of said sleeve.

FREDERICK W. SAMPSON.